Figure 1:
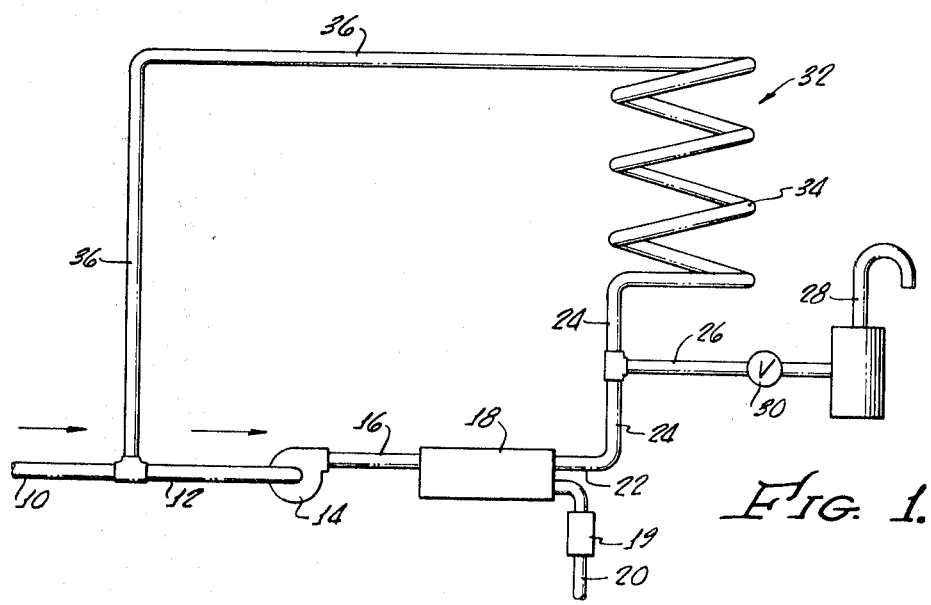

United States Patent

[11] 3,616,921

| [72] | Inventor | Donald T. Bray |
| | | 732 Elder Pl., Escondido, Calif. 92025 |
| [21] | Appl. No. | 864,764 |
| [22] | Filed | Oct. 8, 1969 |
| [45] | Patented | Nov. 2, 1971 |

[54] WATER PURIFICATION AND STORAGE APPARATUS
8 Claims, 5 Drawing Figs.

[52] U.S. Cl.................................................. 210/195,
210/196, 210/253, 210/257, 210/321, 210/433
[51] Int. Cl........................................................ B01d 31/00
[50] Field of Search............................................ 210/23,
321, 257, 433, 195, 196, 253

[56] References Cited
UNITED STATES PATENTS
3,493,496  2/1970  Bray et al...................... 210/321 X Primary Examiner—Frank A. Spear, Jr.
Attorney—Thomas D. Lane ABSTRACT: A water purification system employs a reverse osmosis water purification unit whose purified water output is temporarily stored by introduction into one end of an elongated conduit, for example a long pipe. The other end of the elongated conduit is connected to a line supplying impure feed water under pressure to a pump which raises the feed water pressure for introduction into the reverse osmosis unit. The purified water stored in the elongated conduit is maintained under pressure by reason of its connection to the pressurized feed water supply line, and is available for use from a connection made to that end connected to the purification unit output. Mixing or intermingling of the feed water and purified water is restricted essentially to that resulting from diffusion, and is therefore small. Alternative conduits which can serve for product water storage container include a series of interconnected elongated tanks or pipes, a tank containing a separator to divide its interior into a number of flow channels and a tank containing packing, for example, raschig rings, broken tile, or inert powder or granules.

PATENTED NOV 2 1971 3,616,921

INVENTOR.
DONALD T. BRAY

AGENT.

WATER PURIFICATION AND STORAGE APPARATUS

This invention relates to a water purification system operating by reverse osmosis, and in which purified water is stored temporarily for use.

Reverse osmosis purification systems operate very satisfactorily to produce purified water from municipal water supplies, for example, and can provide a water product of quality at least as good as so-called bottled spring water. A reverse osmosis unit, however, operates continuously to produce product water at a relatively slow rate. Therefore storage capability must be incorporated into the system to provide sufficient volume to satisfy a temporary relatively large demand. The stored water should preferably be stored underpressure to provide transfer to point of use, without use of a pump which would require electrical as well as mechanical connection, and could involve considerable expense. Systems for storing product water underpressure are described and claimed in Ser. No. 728,410 filed May 13, 1968, now U. S. Pat. No. 3,493,496, in which I am inventor jointly with Ross M. Brown, and in Ser. No. 781,912 filed Dec. 6, 1968, now Pat. No. 3,568,843, inventor Ross M. Brown. The storage tanks illustrated in these applications are provided with internal diaphragms of rubber or other flexible material to separate stored water from a driving fluid such as compressed air or pressurized water. The diaphragm separator works efficiently to prevent any intermingling of purified water with other water used for pressurization. The tank with its separator diaphragm must however be especially designed and constructed for the purpose.

Summarized briefly, this invention provides a simple, efficient and economical temporary water storage container for use in a reverse osmosis water purification system, which comprises a conduit such as a long pipe, having at least one small diameter flow channel, to which is connected at one end the output product water of a reverse osmosis purification unit, the other end of the conduit being connected to the pressurized feed water supply being introduced into the reverse osmosis unit. Another connection is made to the purified output of the reverse osmosis unit to deliver water to point of use underpressure and the purified water delivered may come, as will be apparent, either from the reverse osmosis unit or from the stored water container.

The feed water is supplied to the reverse osmosis unit under pressure as from a water main source, and this pressure applied to one end of the storage conduit maintains the stored water under substantial pressure for distribution and use. There is no physical separation between purified stored water and the feed supply water in the storage conduit, however contamination is slight because intermingling of the feed water and purified product water is generally limited to that resulting from diffusion which is a slow process, and the contamination is restricted to a small volume occupying a short section of the conduit and which moves back and forth inside the conduit as purified water is withdrawn and then replaced. Gross contamination as by convection is avoided by the relatively small diameter of the conduit or flow channels.

Figure 2:
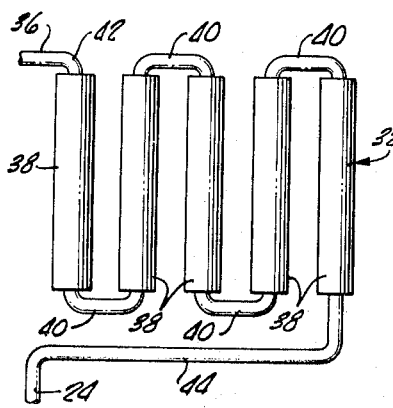
Figure 3:
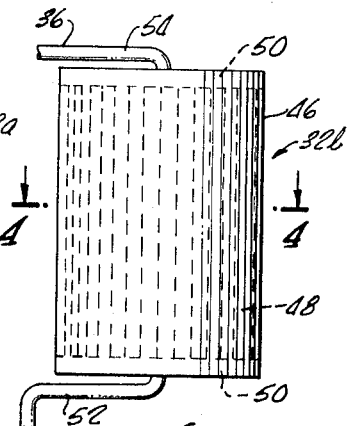
Figure 4:
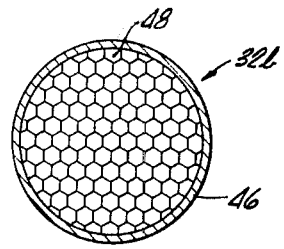
Figure 5:
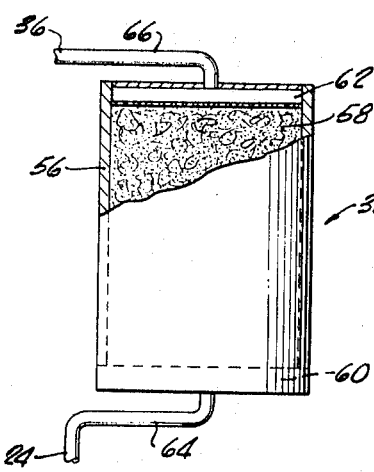

Construction and operation of the apparatus of this invention will be more readily apparent from the following more detailed description thereof and from the annexed drawings in which:

FIG. 1 illustrates, partly diagrammatically, water purification apparatus embodying features of this invention, FIG. 2 illustrates a modification of the purified water container in the apparatus of FIG. 1, FIG. 3 shows a side view of another modification of the purified water container in the apparatus of FIG. 1, FIG. 4 shows a horizontal cross section of the purified water container of FIG. 3 taken along the line 4—4, FIG. 5 shows a side view, partly broken out of yet another modification of the purified water container in the apparatus of FIG. 1.

Referring now particularly to FIG. 1, the impure feed water line 10, already under pressure as from a municipal main, is connected by pipe 12 to pump 14 which raises its pressure for introduction through pipe 16 into a reverse osmosis purification unit comprising a reverse osmosis purifier 18 equipped with brine flow control means 19 through which the brine from unit 18 may be led to sewer through pipe 20. Reverse osmosis purifier 18 may be of conventional design such as the spiral wound-type described in U.S. Pats. 3,367,504 and 3,417,870 and also described on pages 42 and 43 of the 1964 Saline Water Conversion Report of the United States Department of the Interior, Office of Saline Water and additionally described in aforementioned Pat. application Ser. No. 728,410. Brine flow control means 19 may comprise a pressure relief valve set to maintain a back pressure in the purifier 18 sufficient to provide driving force for separation of salts and impurities from the impure feed water by reverse osmosis through a semipermeable membrane. Alternatively the brine flow control means may comprise a restricted passage or conduit of length and diameter to control brine flow at the desired level, and to maintain working pressure in purifier 18. If convenient or desirable the brine flow control may be included in the same housing or shell with the purifier which will include a semipermeable membrane cartridge or assembly and thus the "purification unit" as referred to may include its brine flow control.

The purified water outlet 22 of reverse osmosis purifier 18 is connected as by pipes 24 and 26 to fount 28 controlled by valve 30, and through which purified water may be withdrawn when desired.

When purified water is not being withdrawn from fount 28 it flows through pipe 24 into one end of a temporary storage container formed as a conduit 32 which in the embodiment illustrated in FIG. 1 is composed of elongated pipe 34; the other end of conduit 32 being connected by pipe 36 to feed water supply line 10 as shown.

In FIG. 2, conduit 32a is formed by a number of relatively small diameter elongated tanks or tubes 38 connected in series by suitable pipes 40, and by pipes 44 and 42 respectively to pipe 24, which is connected to the purified water output of reverse osmosis purifier 18, and to pipe 36 which is connected to feed water supply line 10.

In FIGS. 3 and 4 conduit 32b is formed by a cylindrical tank 46 having an internal separator 48 which divides the tank interior into a number of shaped (e.g., hexagonal) flow channels. Separator 48 is of honeycomb cross-sectional appearance as seen in FIG. 4, and the separated channels lead into manifolds 50 which are connected at one end by pipe 52 to pipe 24 which in turn is connected to the purified water output of reverse osmosis purifier 18 and the other end is connected by pipe 54 to pipe 36 which connects to feed water supply line 10.

In FIG. 5 conduit 32c is formed of a tank 56 whose interior is filled or packed with a packing 58 which comprises subdivided inert material such as broken tile or ceramic rings used conventionally for tower packing in the chemical industry, or as illustrated may comprise finely divided inert material such as powder or granules. Packing 58 divides tank 56 interior into a large number of flow channels communicating at each end with manifolds 60 which are in turn connected through pipes 64 and 66 to the pipes 24 and 36 which connect respectively to the output of purified water from reverse osmosis purifier 18, and to feed water supply line 10.

It will be understood that modifications 32a, 32b, and 32c can be substituted for conduit 32 in the apparatus of FIG. 1, being simply connected to the same pipes 36 and 24 as shown.

Conduit 32 and its modifications 32a, 32b, and 32c, are designed to contain sufficient volume to hold the desired amount of purified water to be temporarily stored. In the case of pipe, or lengths of connected pipe, a considerable length may be required when the pipe is of relatively small internal diameter, which is advantageous. For example it will require about 800 feet of ½-inch diameter pipe or tubing to contain 5 gallons of purified water. In the case of tanks with separations or packing the actual water volume will be the net open space and these also should be arranged so that the flow channels formed are of small diameter for reasons hereinafter discussed in detail.

Operation of the apparatus of this invention is extremely simple. When purified water is first produced by reverse osmosis purifier 18, and not withdrawn from fount 28, it flows through pipe 24 into one end of pipe 34 (which forms conduit 32) displacing water originally contained therein. Ultimately, if purified water is not withdrawn from the system, it will fill conduit 32 and flow through pipe 36 to connect with feed supply pipe 10 and into the feed of pump 14 through pipe 12. When water is withdrawn in any appreciable amount from fount 28 it is at least in part withdrawn from conduit 32 and feed supply water from pipe 10 flows up pipe 36 into conduit 32 to replace the amount of purified water withdrawn. Conduit 32 now may contain some impure feed water and some purified water, these being separated by a relatively small amount of mixed impure and purified water. When the diameter of pipe 34, for example in FIG. 1, is small, the slow diffusion rate limits contamination of purified water by impure feed water to a relatively insignificant amount, and this small amount of contaminated water occupied a negligible proportion of the volume of the total length of the storage conduit. The small pipe diameter is effective to prevent gross contamination and intermingling of the impure and purified water by convention, and limits the intermediate mixture to a small volume resulting principally from diffusion, and which may travel back and forth along conduit 32 (or its alternatives) as purified water is introduced therein to or withdrawn therefrom. The interconnected tanks or tubes of the embodiment of FIG. 2 and the separated flow channels in FIGS. 3 to 5 accomplish the same effect, that is to maintain the stored purified water in a tube or channel or channels of small diameter to prevent appreciable intermixing the impure and purified water. After water withdrawal and closing of fount valve 30, purified water again flows into conduit 32 displacing the zone of mixed impure and purified water back along conduit 32 and eventually, depending on the length of time that valve 30 is maintained closed, to fill it either partially or fully with purified water. There is little contamination of the purified water, and the feed supply water being directly connected to one end of conduit 32 provides its supply line pressure for pressurization of conduit 32 contents. Thus purified water is supplied to fount 28 under substantially the same pressure as the feed water supply.

The physical dimensions of conduit 32 may vary considerably depending on storage requirements. The flow channel or channels must, however, be small as discussed above to prevent comingling and contamination of the impure and purified water. An elongated pipe of small diameter will be effective and the alternative conduits as described will function in the desired manner.

The water purification and storage apparatus of this invention is advantageous in that it is simple, reliable and efficient. No expensive control valves are required and the stored purified water may be maintained at relatively high pressure. Since the pressure in the storage conduit is maintained by connection of one of its ends to the supply line pressure, the purified water will be delivered at almost, or a large proportion of, this pressure for ultimate use. The action of the system is automatic; if excess purified water accumulates in the storage system it flows back into the pump intake. No diaphragm-type storage tanks are required. The separation between impure and purified product water is not as complete as with a diaphragm but with comingling reduced to a small volume, effective separation is quite adequate for normal use.

I claim:

1. Water purification and storage apparatus comprising; a reverse osmosis water purification unit;

means for supplying feed water at a pressure above atmospheric to a pump which supplies said feed water to said purification unit at a pressure higher than said feed water supply pressure; and a container in which purified water produced by said purification unit is temporarily stored; in which the improvements comprise:

a. said container for temporarily storing said purified water comprising an open conduit a major portion of the storage capacity of which comprises at least one flow channel of small cross-sectional area, said conduit connected at one end to the purified water output connection of said reverse osmosis purification unit and at its other end to said feed water supply means; and b. means for delivering purified water for use, connected to the purified water output connection of said reverse osmosis purification unit.

2. Apparatus according to claim 1 in which said conduit in (a) comprises an elongated pipe.

3. Apparatus according to claim 1 in which said conduit in (a) comprises a plurality of interconnected pipes.

4. Apparatus according to claim 1 in which said conduit in (a) comprises a tank containing separator means dividing its interior into a plurality of separated flow channels.

5. Apparatus according to claim 1 in which said conduit in (a) comprises a tank containing a honeycomb separator dividing its interior into a plurality of separated flow channels.

6. Apparatus according to claim 1 in which said conduit in (a) comprises a tank containing packing forming means for dividing its interior into a plurality of flow channels.

7. Apparatus according to claim 6 in which said packing is composed of subdivided inert material.

8. Apparatus according to claim 7 in which said packing is composed of inert powder.